United States Patent [19]

Melbye et al.

[11] Patent Number: 4,482,927
[45] Date of Patent: Nov. 13, 1984

[54] TERNARY MAGNETIC RECORDING AND REPRODUCING SYSTEM WITH SIMULTANEOUS OVERWRITE

[75] Inventors: Hartvig E. Melbye, Boulder, Colo.; George V. Jacoby, Los Altos, Calif.

[73] Assignee: Sperry Corporation, New York, N.Y.

[21] Appl. No.: 339,353

[22] Filed: Jan. 15, 1982

[51] Int. Cl.³ .............................................. G11B 5/09
[52] U.S. Cl. ...................................... 360/40; 360/39
[58] Field of Search .............................. 360/66, 39, 40

[56] References Cited

U.S. PATENT DOCUMENTS

| | | | |
|---|---|---|---|
| 2,894,796 | 7/1959 | Reynolds | 360/66 |
| 3,573,766 | 4/1971 | Perkins, Jr. | 360/40 |
| 4,067,050 | 1/1978 | Munninghoff | 360/40 |
| 4,190,868 | 2/1980 | Moulin | 360/1 |

Primary Examiner—Vincent P. Canney
Attorney, Agent, or Firm—Howard P. Terry

[57] ABSTRACT

A saturated flux equivalent to three amplitude level recording is attained by recording two levels by conventional saturation of the medium and the third level by writing a high frequency which erases old data and is read back as a zero level due to limited playback or read frequency response.

23 Claims, 25 Drawing Figures

TERNARY MAGNETIC RECORDING AND REPRODUCING SYSTEM WITH SIMULTANEOUS OVERWRITE

BACKGROUND OF THE INVENTION

1. Field of the Invention

The present invention relates primarily to digital magnetic recording systems. The invention may be considered as a system that converts binary data into ternary data and records the ternary data on a magnetic medium. The ternary data read from the medium is converted back into the corresponding binary format. The concepts of the present invention may also be utilized in digital communication systems. Other ternary systems are disclosed in the applications of Chao S. Chi for "Controlled Return to A.C. Digital Magnetic Recording and Reproducing System", Ser. No. 339,352, filed concurrently herewith, and in the application of George Jacoby and Martin Cohen for "Ternary Data Encoding System", Ser. No. 260,248, filed May 5, 1981.

2. Description of the Prior Art

Present day digital magnetic recording systems typically record binary data by utilizing binary valued write current waveforms. For example, in the conventional return-to-zero (RZ) and non-return-to-zero (NRZ) formats each cell of the medium is magnetized either in the positive direction or the negative direction to represent the two binary data states. In a modified NRZ format (NRZI) a transition from the existing polarity of magnetization to the opposite polarity of magnetization is recorded for a binary ONE and no transition is recorded for a binary ZERO.

It is a desideratum of the magnetic recording art to increase the information density stored on the medium by, inter alia, packing the magnetic flux transitions as closely as possible on the medium. Depending on the configuration of the magnetic interface, non-linear distortions and intersymbol interference degrade data recovery reliability because of such factors as pattern dependent amplitude attenuation, which affects bit resolution, and timing displacement anomalies such as peak shift. Conventionally complex and hence expensive signal processing channels are provided to enhance data recovery reliability in such systems utilizing high bit packing density of the medium.

Another technique utilized to increase the storage efficiency of the medium is to encode the binary data by various run-length-limited codes. Although providing significant improvements in recording density efficiency, systems utilizing such codes are nevertheless restricted by the basic limitations of the interface.

It should be noted that only the position of the transition, not the polarity of the transition, has been commonly used to convey information in the present day saturated digital magnetic recording systems. Such a system may be considered as having only one degree of freedom and is limited to binary data.

A shortcoming of such prior art systems is manifested in the inability to freely choose between different transition polarities while maintaining the medium in saturation.

Another basic requirement in digital magnetic recording systems is overwrite of old data. When new data is recorded in prior art saturated magnetic recording systems, saturation current must be utilized to effectively erase the old data. Thus, a recording system utilizing plus and minus flux saturation in the traditional manner had the advantage of always saturating the medium so that recording new data automatically erased the old. However, since only two saturated states were possible the system was limited to binary data.

It is generally known that the information density of magnetic recording systems may be enhanced by providing higher order recording than binary. For example, the NRZ and RZ formats may be enhanced by utilizing the zero write current state as an information bearing condition in conjunction with positive and negative magnetization. Such a ternary system will not provide the necessary function of overwrite of old data when new data is recorded. A separate erase cycle may be utilized to obviate the problem but this is generally considered unacceptable in high speed present day digital magnetic recording systems.

The problem of enhancing information density by providing higher orders states is a problem of selecting signal waveforms having multiple degrees of freedom (to represent higher order states) which are not distorted beyond recognition by the magnetic recording system. This is a problem of considerable complexity due to severe waveform distortion and intersymbol interference that can occur at higher densities, and due to amplitude instability and dropouts caused by imperfections in the magnetic media. The problem is further complicated by the fact that the inductive readback magnetic recording system has a limited bandpass transfer function, incapable of reproducing very long or very short wavelengths, and by the fact that the magnetic medium is non-linear unless kept constantly saturated or otherwise impressed with an a.c. bias.

SUMMARY OF THE INVENTION

The above discussed disadvantages of the prior art are overcome by the present invention by utilizing positive magnetic saturation, negative magnetic saturation, and high frequency flux reversals or dither to yield the additional degrees of freedom needed for ternary and higher order coding systems. A first information bearing state is defined at a data cell of the medium by applying a positively saturating write current, thereby inducing a region into positive magnetization, preferably positive saturation. A second information bearing state is defined at a data cell by applying a negatively saturating write current to induce a region into negative magnetization or saturation. A third information bearing state is defined by applying a medium-erasing, rapidly alternating reversal or dither signal at a data cell of the medium. During readback, the positively magnetized and negatively magnetized regions of the medium induce positive and negative pulses in a differentiating read head. Due to the bandwidth limitations of the medium and the recording system, the third information bearing state, defined by the dither signal, is perceived by the read head as a region of zero megnetization. The recording system thus enjoys higher information storage density and simultaneous overwrite of old data without the need for linearizing a.c. bias. The invention further comprises a means for mapping binary data, in the NRZ format for instance, in two groups or sets of ternary digits. There ternary digits are then converted into positive-going or negative-going write current transitions or into rapidly alternating dither signals which may be applied to a magnetic medium by means of a write head.

BRIEF DESCRIPTION OF THE DRAWINGS

FIG. 1, consisting of 1A and 1B, is a waveform diagram of the write current of the invention together with a symbolic representation of the three possible information bearing states.

DESCRIPTION OF THE PREFERRED EMBODIMENT

Figure 1A:
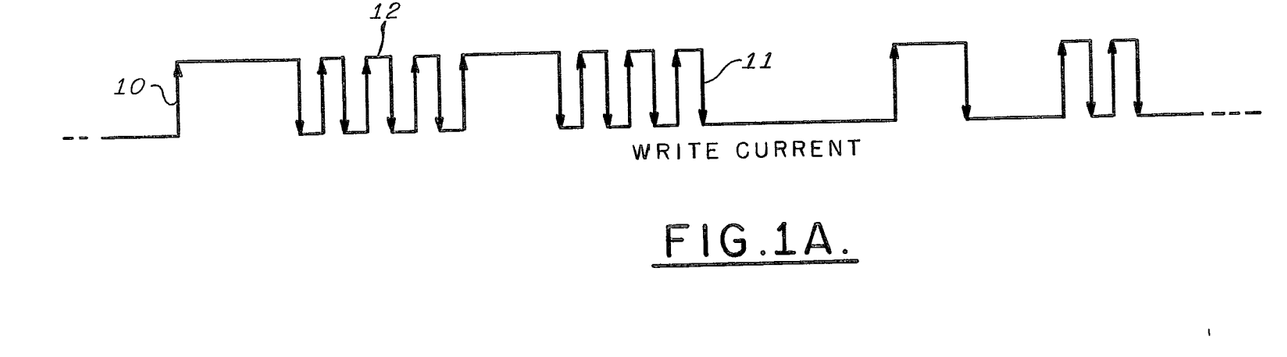
Figure 1B:
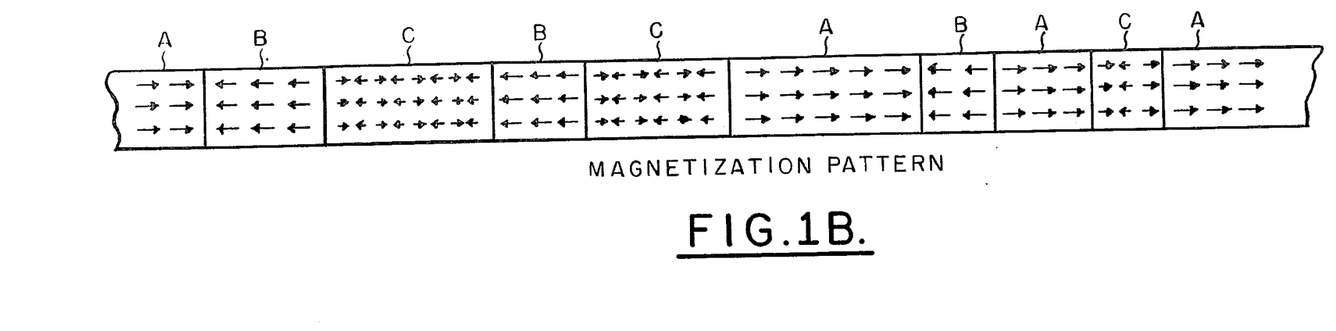

Referring to FIG. 1, waveforms illustrating the underlying concepts of the present invention are illustrated. With reference to FIG. 1A, the write waveform comprises an alternating succession of positive-going and negative-going transitions. The transitions may be considered as saturation currents which may be provided to a write head to produce magnetic flux reversals and to induce a magnetization pattern in the magnetic medium, shown diagrammatically in FIG. 1B. Preferably, the intensity of the flux should be sufficient to saturate the magnetic medium (except during the short transition region). A positive-going transition, denoted by reference numeral 10, is generated by applying a positive saturation current for a sufficient period to impose an orderly spatial orientation or regional alignment of magnetic particles within the medium, denoted by the letter B in FIG. 1B. Similarly, a negative-going transition, denoted by numeral 11, is generated by applying a negative saturation current to impose a regional magnetic alignment of opposite polarity within the medium, denoted by the letter A in FIG. 1B. The positive and negative transitions, and the corresponding polarized magnetization patterns in the medium define two information bearing states. A third information bearing state is defined by a rapidly reversing or alternating succession of positive-going and negative-going transitions or dither, denoted by reference numeral 12. The frequency of alternation in the third state is sufficiently high to erase the medium, and due to the limited high frequency signal response during read or playback, zero output signal will be recovered, thus giving the appearance of a zero magnetization region or state, denoted by letter C in FIG. 1B. In addition to solving the overwrite problem by erasing old data, this high frequency signal or dither provides additional degrees of freedom to the system thus permitting higher order record modes. The three regions A, B, and C may be considered as defining three ternary states. It will be understood that the waveforms and magnetization patterns of FIG. 1 are exemplary and that the order of occurrence of regions A, B, and C may vary with the data represented.

Figure 2:
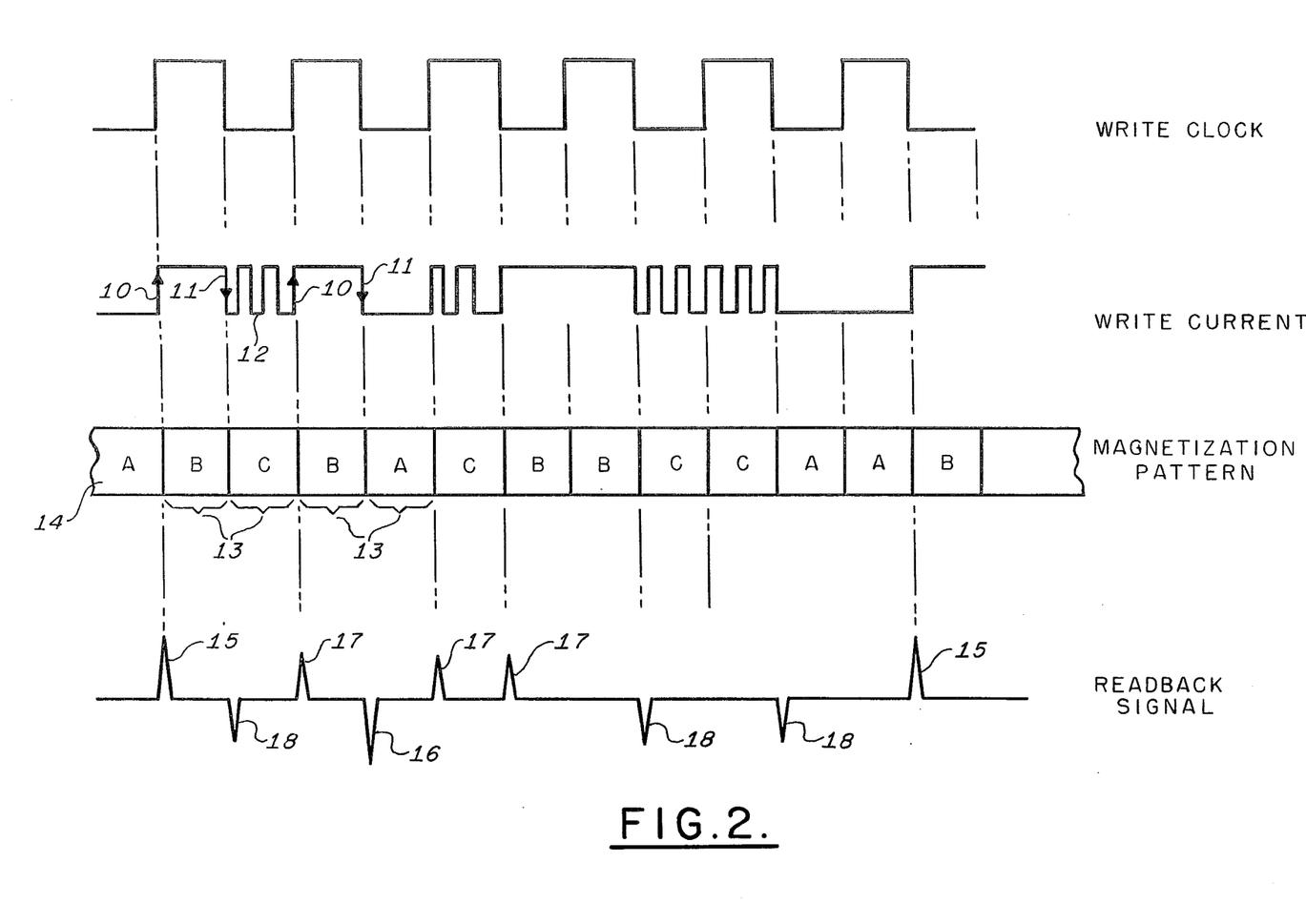
FIG. 2 is a waveform diagram and symbolic representation of the information bearing states shown in conjunction with the system write clock and in conjunction with the read waveforms resulting therefrom.

Referring now to FIG. 2, in the preferred embodiment of the invention the three ternary states are constrained to occur coherently at regularly occurring detents or data cells 13 on the medium 14. The leading edges and trailing edges of the states occur synchronously with respect to the system write clock. In order to attain freedom of recording directionality, the alternating dither signal is shifted in phase and in frequency, in a manner to be described, so that freely chosen positive-going transitions 10 and negative-going transitions 11 may occur in synchronism with the system clock. This avoids the need of using very high frequency to achieve effective erasure as well as to maintain accurate data cell width. The freedom of recording directionality attained by the present invention therefore permits higher order information states with respect to prior art binary systems, with a concomitant increase in recorded data intensity.

Utilizing an inductive read head, the readback signal is a sequence of pulses having two possible polarities and independently having two possible amplitudes, depending on the sequence of magnetization states within the data cells of the medium. As shown in FIG. 2, the readback signal comprises a major amplitude positive-going pulse 15 with the occurrence of a transition from a negatively saturated data cell to a positively saturated data cell. For convenience data cells denoted by the letter A will be regarded as negatively saturated, data cells denoted by B will be regarded as positively saturated, and data cells denoted by letter C will be regarded as erased or otherwise without a readable saturation state. The readback signal further comprises a major amplitude, negatively-going pulse 16 with the occurrence of each transition from a positively saturated data cell B to a negatively saturated data cell A. A diminished or minor amplitude positive-going pulse 17 occurs with each transition from an erased cell C to a positively saturated cell B, or with the occurrence of each transition from a negatively saturated cell A to an erased cell C. Conversely, a minor amplitude, negatively-going pulse 18 occurs with each transition from a positively saturated data cell B to an erased cell C, or with each transition from an erased cell C to a negatively saturated data cell A.

The positive and negative saturation states together with the medium erasing dither state results in a recording system in which the readback signal constitutes freely chosen positive and negative pulses, each having freely chosen major and minor amplitude states, which may quite efficaciously represent binary, ternary, or higher order information states. Furthermore, operating in saturation, no a.c. biasing is required and the saturation signals provide efficient overwrite of the old data resulting in an improved signal-to-noise ratio. It will be noted that no readback pulse occurs between adjacent cells of like saturation status.

Figure 3:
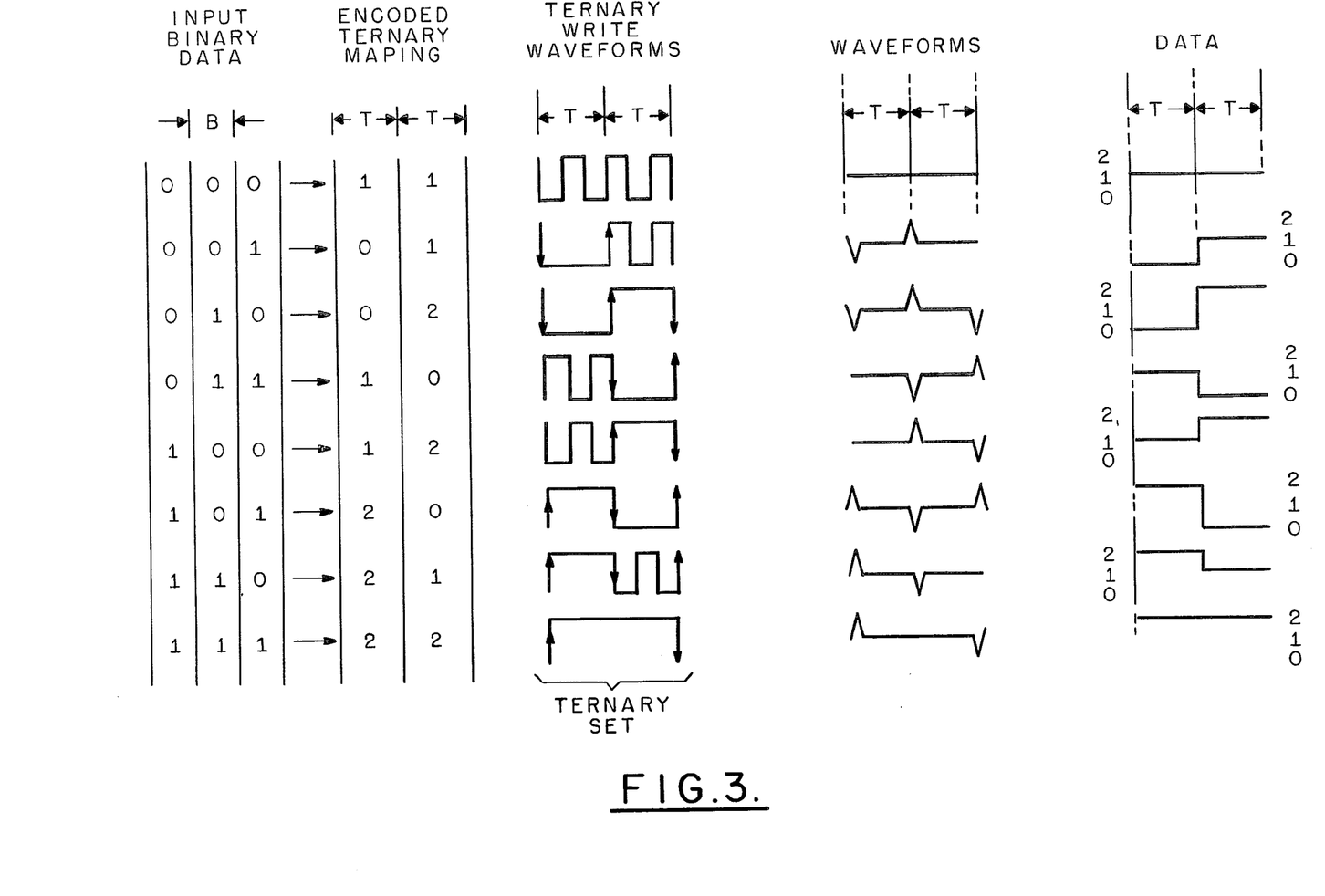
FIG. 3 is a diagram illustrating the mapping of binary digits into ternary write waveforms and the read waveforms resulting therefrom.

In a preferred embodiment of the invention, groups of three input binary digits, for example in the NRZ format, are mapped into a set containing two ternary digits, each ternary digit being conveyed as a positive or negative magnetization of the medium or as dither, the absence of readable magnetization. Tables I and II together with FIG. 3 illustrate a preferred mapping of binary to ternary. In FIG. 3 the eight combinations of three binary input digits are delineated with the corresponding ternary sets and symbolic write waveforms adjacent thereto. It is appreciated that the correspondence between the ternary symbols and the bit patterns of the input binary data is arbitrary.

TABLE I

| Binary | Ternary |
|--------|---------|
| 000 | 11 |
| 001 | 01 |
| 010 | 02 |
| 011 | 10 |
| 100 | 12 |
| 101 | 20 |
| 110 | 21 |
| 111 | 22 |

TABLE II

| Binary | | Ternary | |
|--------|--------|---------|--------|
| 000 | 000 | 11 | 00 |
| 111 | 111 | 22 | 00 |

The ternary write digital waveforms illustrated in FIG. 3 adjacent the ternary symbols depict the preferred mapping from NRZ binary to ternary code. Each group of two ternary digits comprise a ternary set. For convenience, the right most ternary digit is considered to have occurred before the left most ternary digit. It is appreciated that each ternary digit can be represented as negative saturation, positive saturation, or dither. Thus there are nine possible ternary patterns for each ternary set. In Tables I and II these three states are represented by the numerals 0, 1, and 2 where, for convenience, 0 represents negative saturation; 2 represents positive saturation; and 1 represents dither. The correspondence between numeral representation and magnetization state is arbitrary. The combination of two negatively saturated digits (00) is arbitrarily discarded providing eight remaining possible ternary encodings. To ensure a timing reference for the recovery clock the code is modified as shown in Table II. According to Table II, two sets of three binary digits are mapped into two sets of ternary digits for the case corresponding to the binary patterns: 000 000, and 111 111. In this case a special ternary code, utilizing the previously discarded 00 set denotes the second set of binary 000's or binary 111's. This special encoding avoids an unduly long string of ternary 11's or 22's, and insures that transitions will occur at a rate sufficient to provide a timing reference for the recovery clock.

As illustrated in FIG. 3, the spacing between adjacent ternary detents is T. The NRZ input binary data spacing is denoted as B. Since three binary valued digits map into two ternary value digits, T can be 1.5 B for direct information density mapping. Under this condition, the ternary pulses are spaced further apart than would be the corresponding binary pulses, resulting in improved intersymbol interference characteristics. If T equals B, a 50% information density increase is achieved.

With continued reference to FIG. 3, the ternary read signal derived from a differentiating read head is illustrated adjacent each ternary write waveform. The ternary read and write waveforms of FIG. 3 represent the eight possible isolated waveforms. In the isolated cases illustrated, except for dither transitions, each rising edge of a ternary flux transition results in a positive read pulse and each falling edge of a ternary flux transition results in a negative read pulse. The rapidly alternating dither transitions produce no significant read pulse. However, it will be recognized that different read and write waveforms will result when the above described isolated waveforms are concatenated, as was exemplified in FIG. 2. Also illustrated in FIG. 3, adjacent each ternary read signal, are conceptual representations of the decoded ternary data.

It will be appreciated that the mapping illustrated in FIG. 3, and described in Tables 1 and 2, is arbitrary, other encodings into ternary digits being usable in practicing the invention. Additionally, encodings of groups of binary digits greater than groups of 3 into ternary sets comprising more than 2 ternary digits may also be utilized for further increased information density at the expense of system complexity.

Figure 4:
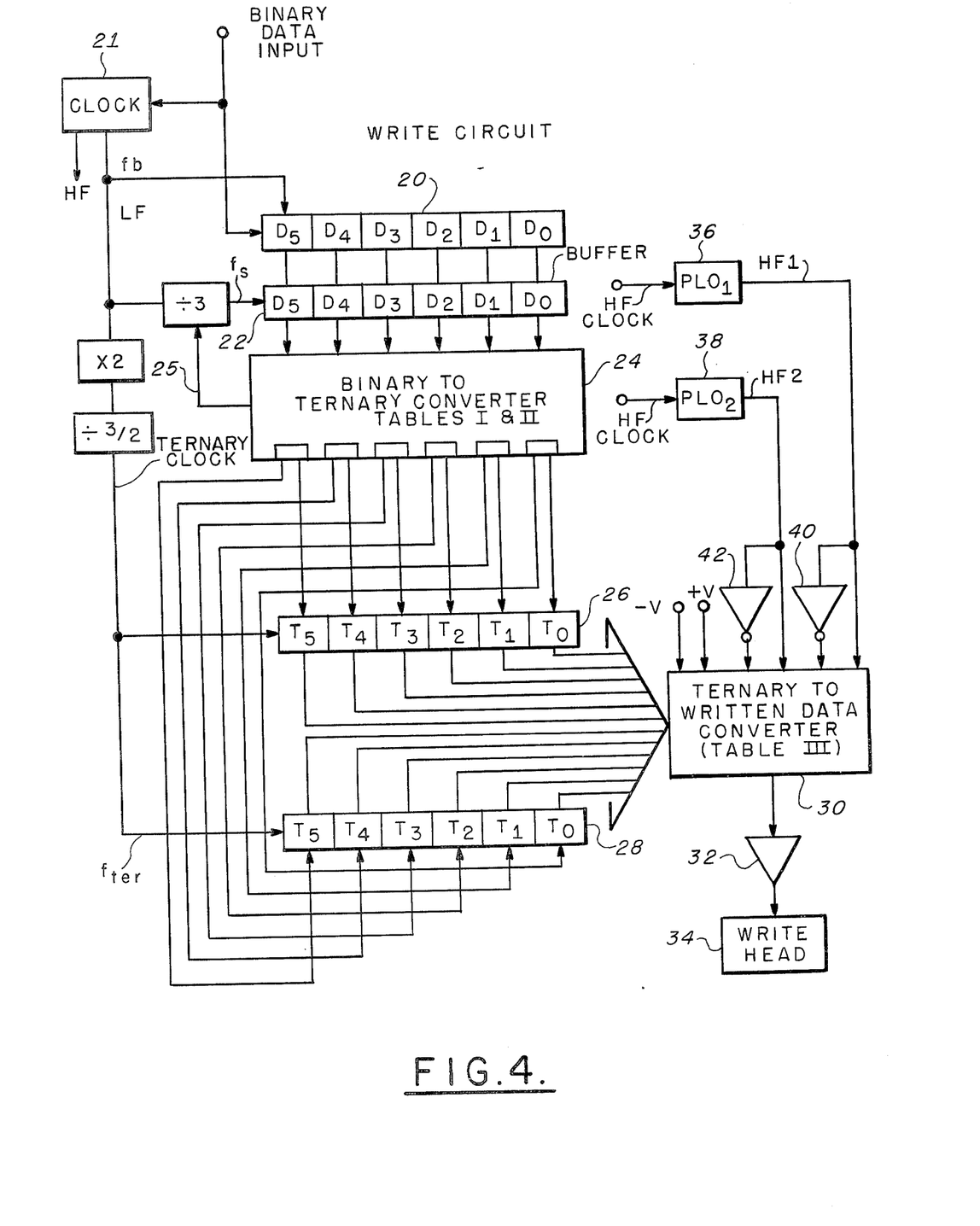
FIG. 4 is a schematic block diagram of the write system of the present invention.

Referring now to FIG. 4, a schematic block diagram of a preferred embodiment of the write portion of the system of the present invention is illustrated. Serial binary input data, for example, in the NRZ format, is applied to the input of a shift register 20 and is shifted through the register 20 by a binary clock $f_b$, as will be further described herein. Preferably, the shift register 20 is a six stage register, the stages denoted as $D_0$ through $D_5$, respectively. It is appreciated that $D_5$ is the latest binary digit to occur and $D_0$, the earliest.

A phase locked oscillator clock block 21 generates a plurality of coherent clocks utilized in the system, including the binary input clock $f_b$. The clock block 21 produces a high frequency clock Hf used for generating the high frequency dither signal, as will be explained, and a low frequency clock LF which is phase coherent with high frequency clock LF. A ternary clock $f_{ter}$ is generated for direct information density mapping by doubling the low frequency clock and dividing by 3. A sampling clock $f_s$ occurs at a rate one third that of $f_b$ and is generated by dividing the low frequency clock by 3.

The binary clock $f_b$ controls the shifting of the serial NRZ binary input data through the shift register 20. The stages $D_2$, $D_1$ and $D_0$ store the current three binary digits to be mapped into the current two ternary digits while the stages $D_5$, $D_4$, and $D_3$ contain three lookahead binary digits to generate the special case mapping of Table II in a manner to be described. In other words, $D_5$, $D_4$, and $D_3$ provide one ternary set look-ahead capability.

After every three shifts of the NRZ data through the register 20, the sampling clock $f_s$ strobes the 6 bits extant in the register 20 into a parallel buffer register 22. Thus, every sequentially occurring group of three binary input digits is loaded into the stages $D_2$, $D_1$, and $D_0$ of the buffer 22 for generation of the corresponding two ternary digits with the lookahead bits $D_5$, $D_4$, and $_3$ providing information with respect to the special case of Table II where two sets of three binary digits are mapped into two sets of ternary digits, such as the case where binary numeral 000 000 maps into ternary number 11 00, or where binary numeral 111 111 maps onto ternary 22 00. The outputs of the buffer register 22 are applied to a binary to ternary converter 24 which provides pairs of ternary digits according to the code in Tables I and II. The binary to ternary converter 24 also provides a blanking pulse through lead 26 which blocks the sampling clock $f_s$ to buffer register 22 when the special condition of Table II is detected. The blanking signal, by blocking one stroke cycle of $f_s$, effectively holds the data in register 22 until all six bits in shift register 20 contain new information not previously found in the look-ahead cells $D_3$, $D_4$, and $D_5$. Those skilled in the art will appreciate that the binary to ternary converter 24 may be implemented, for example, by conventional combinational logic or ROM table lookup procedures or by microprocessor devices.

The output pairs of ternary digits from the binary to ternary converter 24 are applied to a pair of parallel shift registers 26 and 28. Preferably, the shift registers 26 and 28 are six stage registers, the stages denoted as $T_0$ through $T_5$, respectively. It is appreciated that $T_5$ is the latest digit to occur and $T_0$ is the earliest. The parallel shift registers are supplied with the ternary clock $f_{ter}$ which controls the shifting of the serial ternary input data through the parallel shift registers. The state $T_4$ stores the current ternary digit to be written on the magnetic medium. The stages $T_3$, $T_2$, $T_1$, and $T_0$ store the preceding digits of ternary data, and stage $T_5$ stores a look ahead or succeeding ternary digit. The output of the parallel registers 26 and 28 are applied to a ternary to written data converter 30 which supplies write current waveforms through a write amplifier 32 to a write head 34. The ternary to written data converter 30 functions according to Table III, as follows:

TABLE III

TERNARY TO WRITTEN DATA CONVERSION

| Ternary Digits | | | |
|---|---|---|---|
| Preceeding Digits | Digits to be Encoded | Succeeding Digit | Written Data |
| XXXX | 0 | X | Q-V |
| XXX0 | 1 | 0 | HF2 |
| XXX0 | 1 | 1 or 2 | HF1 |
| XXX2 | 1 | 0 or 1 | $\overline{HF1}$ |
| XXX2 | 1 | 2 | $\overline{HF2}$ |
| XX01 | 1 | 0 | HF2 |
| XX01 | 1 | 1 or 2 | HF1 |
| XX21 | 1 | 0 or 1 | $\overline{HF1}$ |
| XX21 | 1 | 2 | $\overline{HF2}$ |
| X011 | 1 | 0 | HF2 |
| X011 | 1 | 1 or 2 | HF1 |
| X211 | 1 | 0 or 1 | $\overline{HF1}$ |
| X211 | 1 | 2 | $\overline{HF2}$ |
| 0111 | 1 | 0 | HF2 |
| 0111 | 1 | 2 | HF1 |
| 2111 | 1 | 0 | $\overline{HF1}$ |
| 2111 | 1 | 2 | $\overline{HF2}$ |
| XXXX | 2 | X | +V |

In the above Table, HF1 and HF2 denote high frequency dither signals according to the following formulas.

$$HF1 = \frac{N}{2T_T} = \frac{N}{3T_B}$$

$$HF2 = \frac{N+1}{2T_T} = \frac{N+1}{3T_B} \text{ for } N = 2$$

$$= \frac{N \pm 1}{2T_T} = \frac{N \pm 1}{3T_B} \text{ for } N \geq 4$$

where
N = even integer
$T_T$ = Ternary digit length (duration)
$T_B$ = Binary digit length (duration)

The symbols $\overline{HF1}$ and $\overline{HF2}$ denote the inverse of HF1 and HF2, respectively. In the preferred embodiment, HF1 is generated by a phase locked loop oscillator 36 which may be synchronized to the HF clock. Similarly, HF2 is generated by a phase locked loop oscillator 38 also synchronized to the HF clock. $\overline{HF1}$ and $\overline{HF2}$ are produced by inverting through inverter and amplifiers 40 and 42, respectively. The dither signals comprising HF1, HF2, $\overline{HF1}$ and $\overline{HF2}$ are applied to the ternary to data converter 30. Also applied to the converter 30 is a positive voltage +V and a negative voltage −V for supplying the positive and negative saturation currents to the write head 34.

Figure 5:
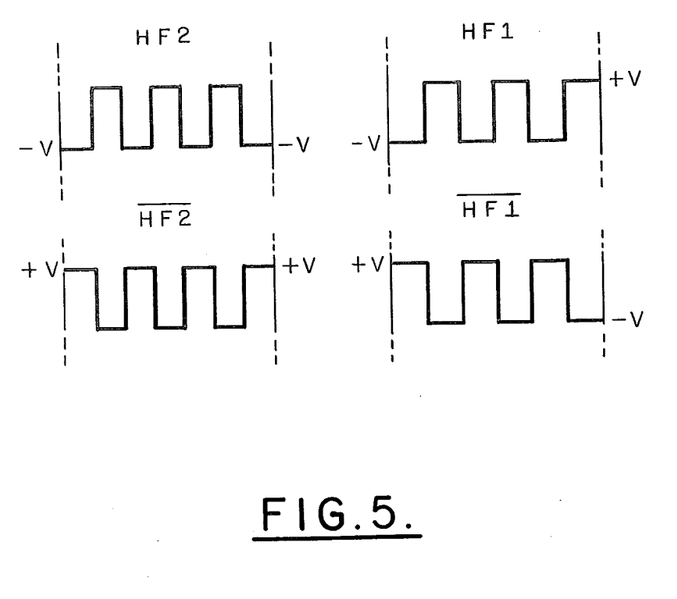
FIG. 5 is a waveform diagram illustrating the dither signal as utilized by the invention.

With reference to Table III and FIG. 4, it will be seen that the column of Table III entitled "Digit to be Encoded" corresponds to the ternary digit stored in data cell $T_4$ of the parallel shift registers 26 and 28. In this regard, it will be understood that the shift registers are conventional binary devices capable of storing either a binary ONE or a binary ZERO, but by operating in parallel, the two registers are capable of storing a representation of ternary data. To give an example, the binary pair 00 might represent the ternary digit 0, binary pair 01 might represent the ternary digit 1, and binary pair 10 might represent the ternary digit 2. Those skilled in the art will appreciate that this parallel shift register design is utilized to take advantage of the wide selection of binary semi-conductor devices, however, ternary and higher order digital devices may be substituted therefor. With continued reference to Table III, it will be seen that the Written Data, which is applied to write amplifier 32, is dependent upon the digit to be encoded and in some cases also dependent upon preceding and succeeding digits. To give a few examples, if the ternary digit to be encoded is a 0, the converter 30 does not care what the preceding or succeeding data cells contain and a −V output is applied to the write amplifier 32. If the ternary digit to be encoded is a 2, the converter does not care about the preceding or succeeding digits and a +V written data signal is applied to the write amplifier 32. If the digit to be encoded is a 1, one of four high frequency dither signals is selected depending upon the preceding and succeeding bits and applied to the write amplifier 32. The four dither signals are shown in FIG. 5. In FIG. 5, each dither signal is constrained within one ternary cell, shown by broken lines, and it will be understood that the frequency of alternation shown is for illustration purposes only, other dither frequencies being possible. By virtue of the HF clock, the phase locked oscillators 36 and 38 are locked in-phase with the system clock 21 and the various LF clocks. From FIG. 5, it will be seen that HF2 begins and ends at a negatively saturating voltage −V and conversely, $\overline{HF2}$ begins and ends at a positively saturating voltage +V. Being slightly different in frequency, according to the formulas discussed above, HF1 begins at negative potential −V and ends at positive potential +V. Conversely, $\overline{HF1}$ begins at positive potential +V and ends at negative potential −V. Thus, the present invention provides complete freedom of directionality with respect to write current polarity.

An alternate ternary to written data conversion scheme is shown in Table IIIA. In the alternate scheme the ternary digits to be encoded are tested to determine the number of consecutive one's and the appropriate dither signal is constructed accordingly. For example, should the ternary data comprise three one's preceded by a ternary two and followed by a ternary zero, the three one's will be written as $\overline{HF1}$ $\overline{HF1}$ $\overline{HF1}$. This condition is marked in Table IIIA with pointer arrows for the reader's convenience. It will be seen that a minimum of six ternary digits must be made available to the ternary to written data converter, which may be implemented by the dual shift register shown in FIG. 4.

TABLE IIIA

ALTERNATE TERNARY TO WRITTEN DATA CONVERSION

| Number of Consecutive Ternary "One" Digits | Preceeding Digit | Digit or Digits to be encoded | Succeeding Digit | Written Data | | | |
|---|---|---|---|---|---|---|---|
| 0 | X | 0 | X | | | | 0 |
| 1 | 0 | 1 | 0 | | | | HF2 |
| 1 | 0 | 1 | 2 | | | | HF1 |
| 1 | 2 | 1 | 0 | | | | $\overline{HF1}$ |
| 1 | 2 | 1 | 2 | | | | $\overline{HF2}$ |
| 2 | 0 | 11 | 0 | | | HF1 | HF2 |
| 2 | 0 | 11 | 2 | | | HF1 | HF1 |
| 2 | 2 | 11 | 0 | | | $\overline{HF1}$ | $\overline{HF1}$ |
| 2 | 2 | 11 | 2 | | | $\overline{HF1}$ | $\overline{HF2}$ |
| 3 | 0 | 111 | 0 | | HF1 | HF1 | HF2 |
| 3 | 0 | 111 | 2 | | HF1 | HF1 | HF1 |
| 3 | 2 | 111 | 0 | | $\overline{HF1}$ | $\overline{HF1}$ | $\overline{HF1}$ |
| 3 | 2 | 111 | 2 | | $\overline{HF1}$ | $\overline{HF1}$ | $\overline{HF2}$ |
| 4 | 0 | 1111 | 0 | HF1 | HF1 | HF1 | HF2 |
| 4 | 0 | 1111 | 2 | HF1 | HF1 | HF1 | HF1 |
| 4 | 2 | 1111 | 0 | $\overline{HF1}$ | $\overline{HF1}$ | $\overline{HF1}$ | $\overline{HF1}$ |
| 4 | 2 | 1111 | 2 | $\overline{HF1}$ | $\overline{HF1}$ | $\overline{HF1}$ | $\overline{HF2}$ |
| 0 | X | 2 | X | | | | |

Figure 6:
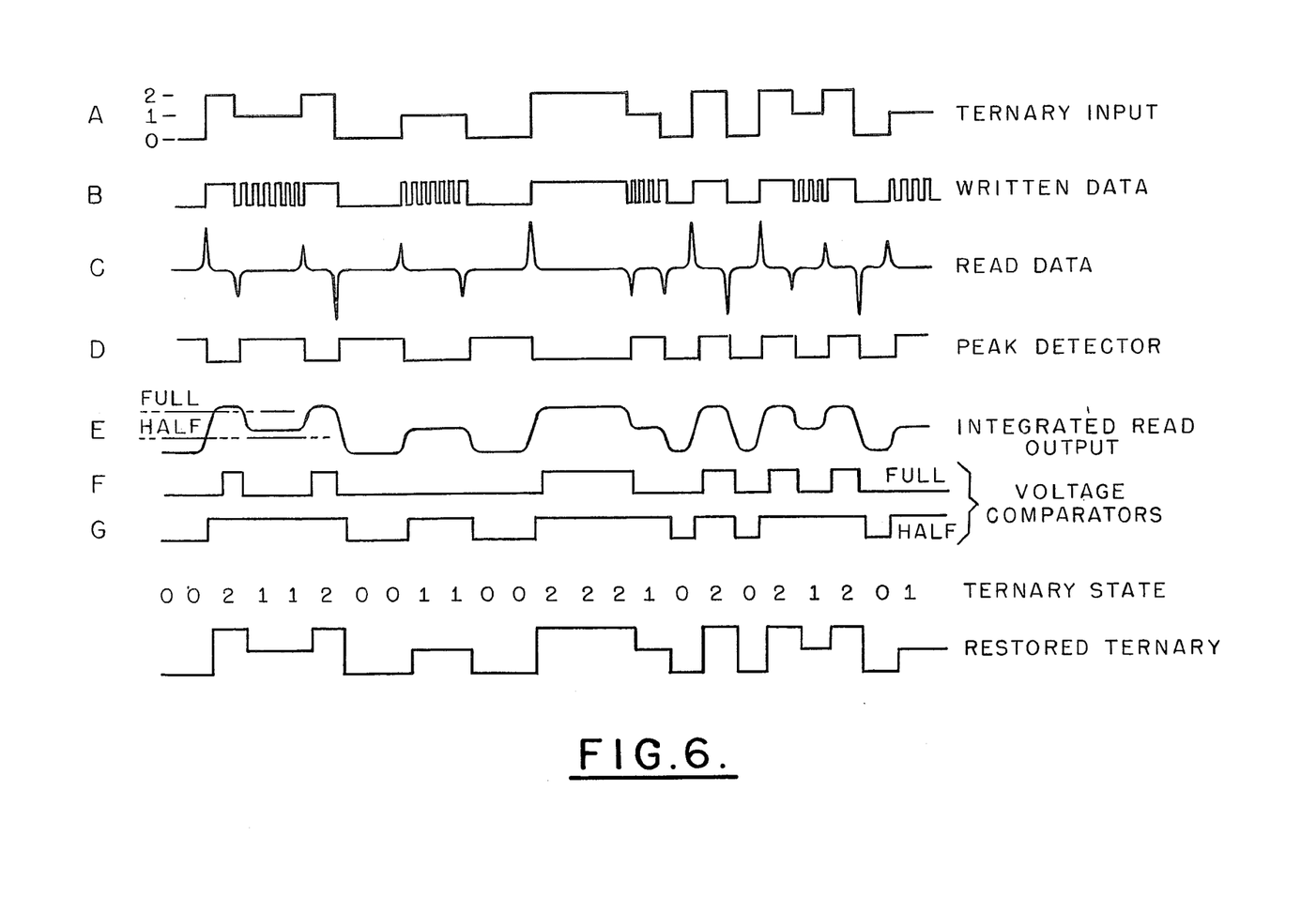
FIG. 6, consisting of A-G, is a waveform diagram illustrating relationships between waveforms with respect to the read system of the present invention in a preferred embodiment.

FIGS. 1 through 5 discussed hereinabove describe the write system of the present invention. As explained, FIG. 3 illustrates the binary to ternary mapping, the ternary write digital waveforms corresponding to groups of three binary input digits and the ternary read signal corresponding to each ternary write signal. The read system of the present invention will now be described with respect to FIGS. 6-9. Line A of FIG. 6 illustrates an arbitrary string of ternary symbols, it being understood that the waveform of line A is merely representative of ternary states. As explained above, in actual implementation of the invention, it may be advantageous to represent these ternary states in terms of binary pairs in order to be compatible with existing digital hardware. Line B of FIG. 6 illustrates the write waveform corresponding to the ternary symbols of line A. Line C of FIG. 6 illustrates the readback signal corresponding to the ternary write signal of line B. It is appreciated that the high frequency dither signal essentially provides zero readback output and therefore the data is conveyed by the ternary write current locations and their pulse polarities and amplitudes. The remaining lines of FIG. 6 are useful in explaining the readback output to ternary restoring circuitry as will be more fully discussed below.

Figure 7:
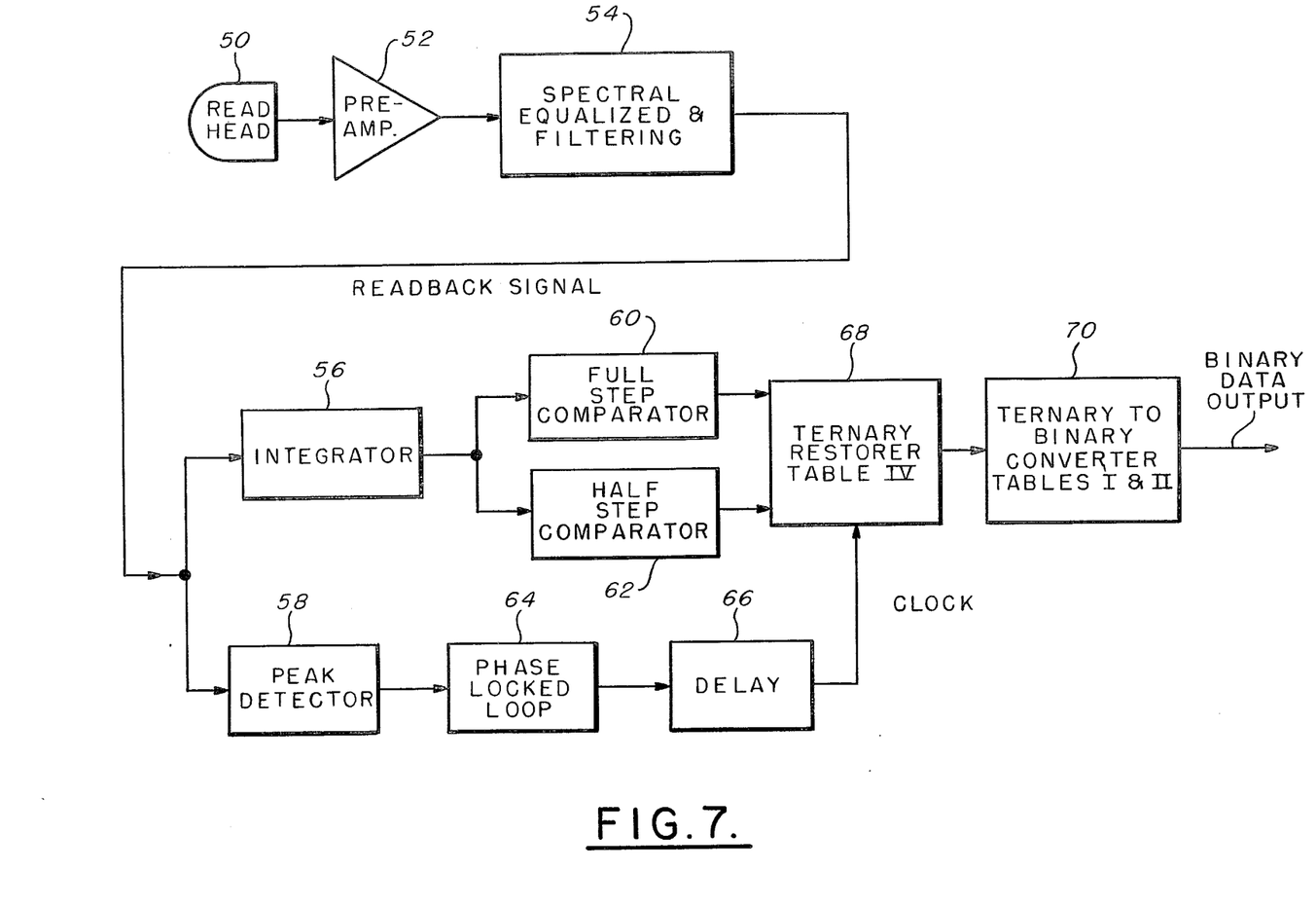
FIG. 7 is a schematic block diagram of the read system of the present invention in a preferred embodiment.

Referring to FIG. 7, with continued reference to FIG. 6, a read head 50 responsive to the recorded ternary write signal provides, via a conventional preamplifier 52, the readback signal such as illustrated on line C of FIG. 6. In order to enhance signal-to-noise ratio and resolution, the readback signal may be passed through conventional spectral equalization and filtering circuitry 54. The equalized and filtered readback signal is then applied to an integrator 56. Preferably the readback signal is clamped to a known d.c. level, and the time constant of integrator 56 is very long compared to the data sector, so as to avoid data-dependent d.c. drift. The integrator's output is illustrated on line E of FIG. 6. The equalized and filtered signal from the circuitry 54 is also applied to a peak detector 58. The output of peak detector 58 is illustrated on line D of FIG. 6. The peak detector, which may be, for example, a differentiator, a zero crossing detector, and gate generator, provides data transition locations. The output of integrator 56 is applied in parallel to a full step threshold voltage comparator 60 and a half step voltage threshold comparator 62. The output voltages of comparators 60 and 62 are illustrated on lines F and G, respectively, of FIG. 6. It will be seen that the output of comparator 60 (line F of FIG. 6) is high when the integrated read output (line E of FIG. 6) is above the full step threshold corresponding to a magnetization polarity change from the negatively saturated ternary 0 state to the positively saturated ternary 2 state or vice versa. The output of comparator 62 (line G of FIG. 6) is high when the integrated read output is above the half step threshold level.

Meanwhile, the output of peak detector 58 is applied to a phase locked loop 64 which generates transitions spaced at intervals equal to the ternary digit lengths or durations. A delay circuit 66 receives the output signal of the phase locked loop 64 to provide a sampling clock pulse in synchronism with the middle of each ternary bit.

The outputs of comparators 60 and 62 together with the clocked signal from delay circuit 66 are applied to a ternary restorer 68. The output of the ternary restorer is set forth in Table IV. Following each clock pulse, the output of the ternary restorer is latched until the occurrence of the next sampling clock pulse. It is appreciated that the restorer 68 may be implemented, for example, by conventional combinational logic or ROM table lookup procedures or by microprocessor devices.

TABLE IV

TERNARY RESTORER

| Voltage comparator states at sampling time | | |
|---|---|---|
| Full Step Comparator | Half Step Comparator | Restored Ternary |
| 1 | 1 | 2 |
| 0 | 1 | 1 |
| 0 | 0 | 0 |
| 1 | 0 | illegal state |

The output of ternary restorer 68 is applied to a ternary-to-binary converter 70 which functions according to the Tables I and II previously described. The resulting binary data output from converter 70 may then be utilized in the binary digital system in the usual fashion.

Figure 8:
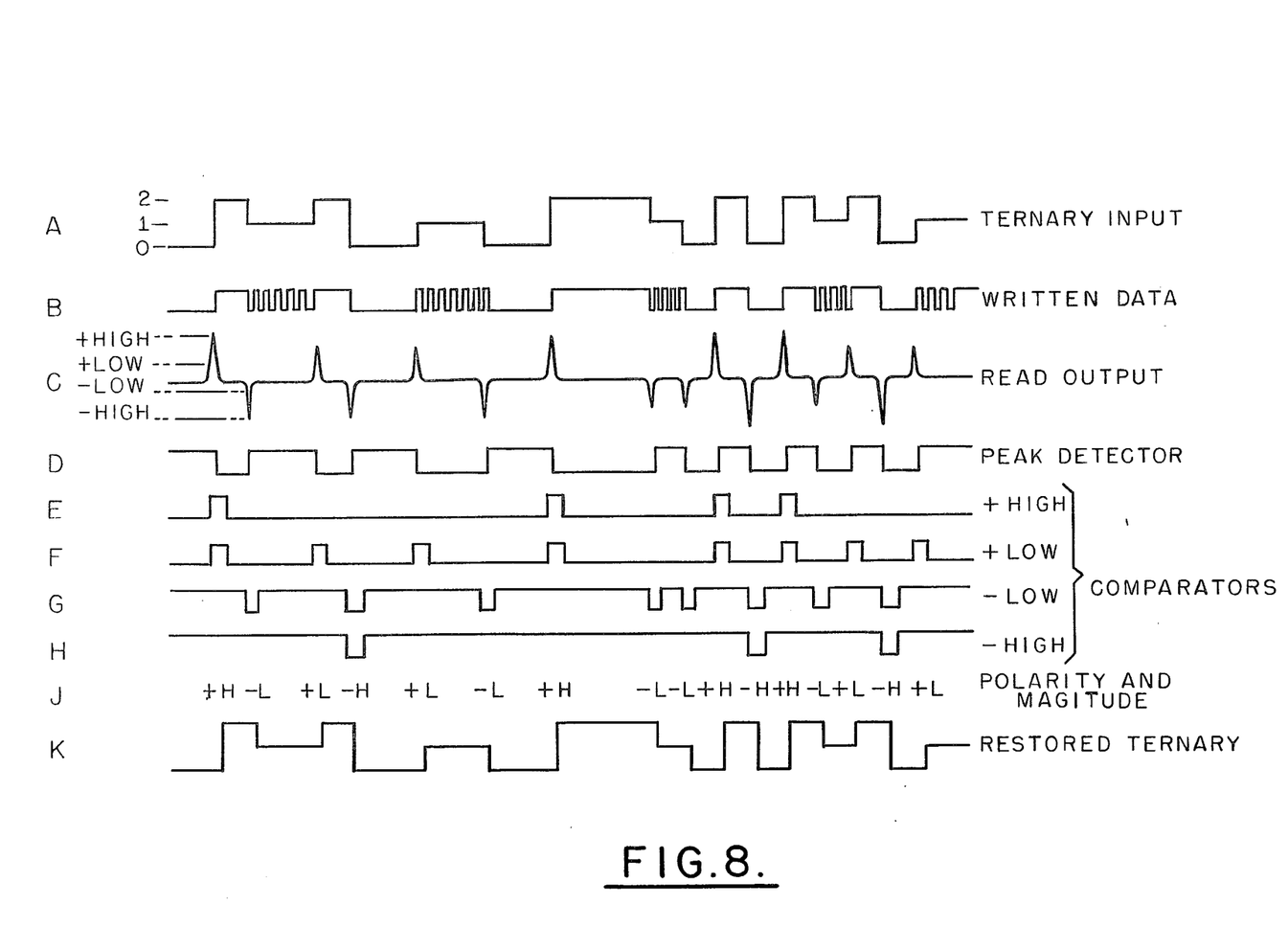
FIG. 8 consisting of A-K is a waveform diagram illustrating the relationship between waveforms with respect to the read system of a second embodiment of the present invention.
Figure 9:
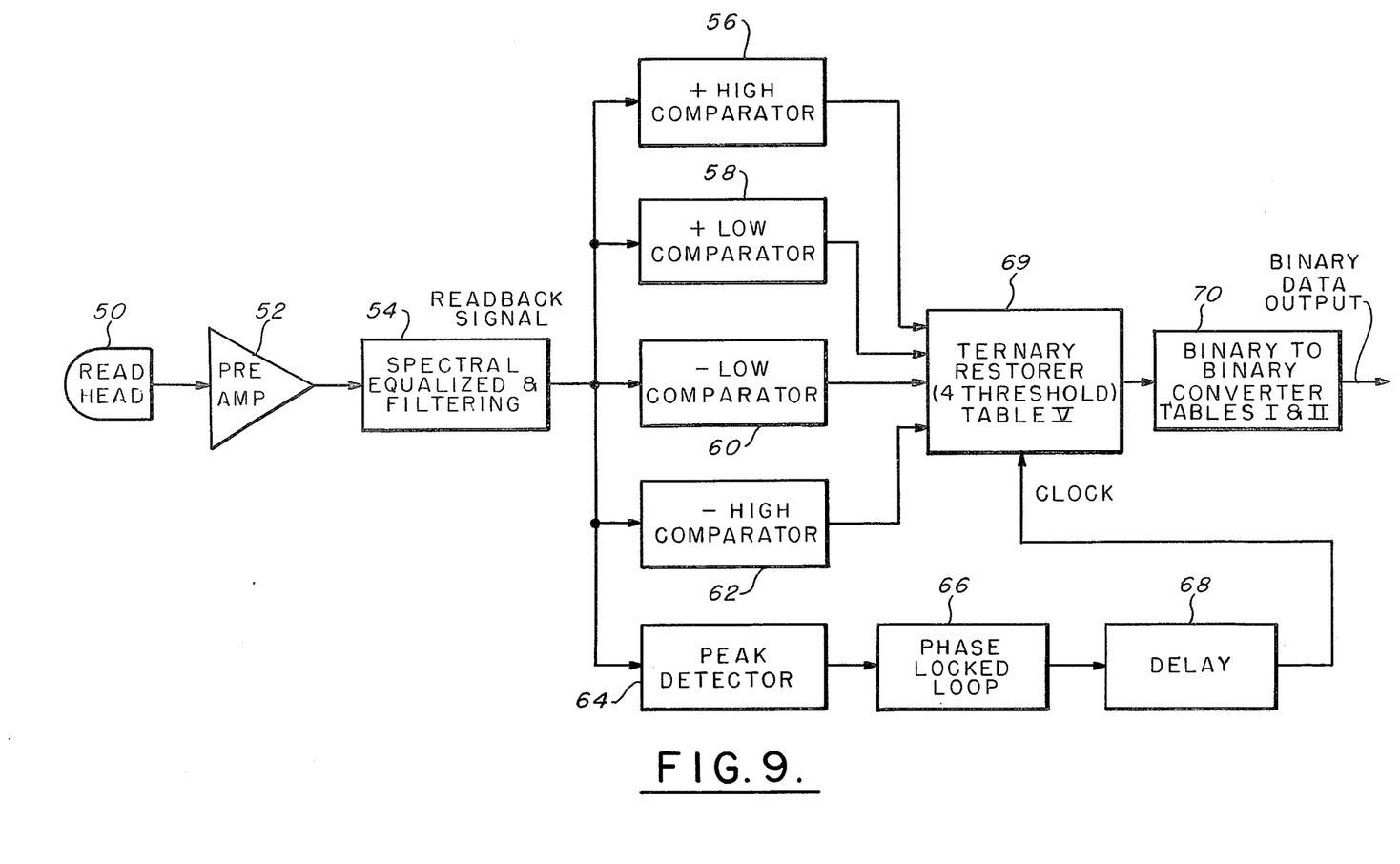
FIG. 9 is a schematic block diagram of a second embodiment of the read system of the present invention.

An alternate read decoding scheme is shown in FIGS. 8 and 9. The readback signal from the read head 50, is processed through preamp 52 and spectral equalization and filtering block 54, and is applied to four parallel threshold comparators. A positive high threshold comparator 56 receives the readback signal and produces an output pulse shown in FIG. 8E when the readback signal is above a positive high threshold as illustrated in FIG. 8C. With reference to FIG. 8A, it will be seen that this positive high voltage readback signal occurs with each transition from the ternary 0 to ternary 2, representing a full transition from negative saturation to positive saturation. A positive low threshold comparator 58 receives the readback signal and produces an output pulse, shown in FIG. 8F, with the occurrence of each positive readback pulse that exceeds a lower positive threshold level as shown in FIG. 8C. It will be appreciated that the low threshold comparator is triggered upon a transition from the ternary 0 to ternary 1 state, from ternary 0 to ternary 2 state or from ternary 1 to ternary 2. A negative low threshold comparator 60 receives the readback signal and produces a negative output pulse, shown in FIG. 8G upon the occurrence of each negative-going readback pulse which exceeds a negative low voltage condition as shown in FIG. 8C. This condition relates to a transition from the ternary 2 state to the ternary 1 state, from the ternary 1 state to the ternary 0 state or from ternary 2 to ternary 0 as shown in FIG. 8A. Finally, a negative high threshold comparator 62 receives the readback signal and produces a negative-going pulse, as shown in FIG. 8H, with the occurrence of each negative-going readback pulse which exceeds a relatively high negative threshold level, as shown in FIG. 8C. This negative readback pulse corresponds to a transition from the ternary 2 state to the ternary 0 state as shown in FIG. 8A.

In a manner similar to the first described readback embodiment, a clock pulse is produced by applying the readback signal to a peak detector 64 whose output is shown in FIG. 8D. The peak detector output is applied to a phase locked loop 66 and then delayed in a delay circuit 68 to determine the location of the readback peaks and to provide the proper sampling time in the middle of each ternary digit. The clock pulse from delay circuit 68 together with the outputs of comparators 56, 58, 60 and 62 are applied to a ternary restorer 69. The ternary restorer 69 operates in accordance with Table V, reproduced below. The ternary restorer may be implemented, for example, by conventional combinational logic or by ROM table lookup procedures or by microprocessor devices.

TABLE V
ALTERNATE TERNARY RESTORER

| Preceeding Ternary State | Voltage Comparator State at sampling time | | | | Restored Ternary |
|---|---|---|---|---|---|
| | + High | + Low | − Low | − High | |
| X | 1 | 1 | 1 | 1 | 2 |
| 1 | 0 | 1 | 1 | 1 | 2 |
| 0 | 0 | 1 | 1 | 1 | 1 |
| 2 | 0 | 0 | 0 | 1 | 1 |
| 1 | 0 | 0 | 0 | 1 | 0 |
| X | 0 | 0 | 0 | 0 | 0 |
| X | 0 | 0 | 1 | 1 | S |

With reference to Table V, it will be seen that the embodiment utilizes preceding ternary state information as well as the four threshold states to produce a restored ternary output. The preceding ternary state information may be stored in shift registers, in a fashion similar to that described in connection with the write scheme, as will be appreciated by those skilled in the art. Or, if a microprocessor is used to implement the ternary restorer 69, the preceding ternary state information may be stored temporarily in RAM storage. The restored ternary output of restorer 69 is shown in line K of FIG. 8. This alternate read decoding scheme, by eliminating the integrator of the first readback scheme, eliminates any data-dependent d.c. drift.

The restored ternary output of ternary restorer 69 is applied to a ternary-to-binary converter 70 which provides binary data output according to the conversion Tables I and II.

It will thus be appreciated that the present invention enables a saturated flux equivalent to ternary or three magnetization level recording and thereby achieves simultaneous erasure of old data. Two of the levels are attained by saturation of the medium in one or the opposite direction. The third level is achieved by writing a signal of adequately high frequency, i.e., rapid switching of the magnetization level. Since the medium is always saturated (with the exception of the transition regions) erasure of old date will be achieved. Due to the limited high frequency playback signal response, zero output signal will be recovered, thus giving the appearance of a zero magnetization level as far as the playback or read output is concerned. Both half and full magnitude pulses will be recovered corresponding to half and full amplitude steps in the ternary input waveform. By detecting polarity and magnitude of the read output, the original ternary input waveform can be restored. The use of conventional binary write compensation and variable frequency high frequency switching can be used to improve date recovery.

While the invention has been described in its preferred embodiments, it is to be understood that the words which have been used are words of description rather than limitation and that changes may be made within the purview of the appended claims without departing from the true scope and spirit of the invention in its broader aspects.

We claim:
1. A magnetic recording and reproducing system for recording information in discrete states on a magnetic medium and recovering said information therefrom, comprising:
   means for magnetizing regions of said medium at a first polarity representing a first of said discrete states, and at a second polarity representing a second of said discrete states,
   means for erasing regions of said medium representing a third of said discrete states wherein said erasing means includes means for generating a multiplicity of alternating reversals and means for controlling the phase and frequency of said alternating reversals in accordance with said groups of binary digits, and
   means for receiving input binary digits
   mapping means responsive to groups of a first predetermined number of said binary digits for controlling the magnetizing and erasing of a second predetermined number of said regions, the polarity of said magnetizing and of said erasing being in accordance with said groups of binary digits, and
   a system write clock wherein said mapping means generates digits of a higher order than binary in response to said binary digits in synchronism with said system write clock, said higher order digits being generated in groups of said second predetermined number in response to said groups of a first predetermined number of binary digits.

2. The system of claim 6 in which said means for erasing comprises means for generating a multiplicity of alternating reversals and means for controlling the phase of said reversals in accordance with said groups of said second predetermined number of higher order digits.

3. The system according to claim 1 in which said means for erasing comprises means for generating a multiplicity of alternating reversals and means for controlling the frequency of said reversals in accordance with said groups of said second predetermined number of higher order digits.

4. The system of claim 1 which includes a system write clock and in which said mapping means receiving a first predetermined number of binary digits and produces a second predetermined, fractionally lesser, number of digits in synchronism with said system write clock.

5. The system of claim 1 wherein said mapping means generates ternary digits in response to said binary digits, said ternary digits corresponding to said first, second, and third discrete states.

6. The system of claim 5 in which said mapping means receives binary digits in groups of three and produces ternary digits in groups of two corresponding to said group of three binary digits.

7. The system of claim 6 wherein said mapping means generates groups of two ternary digits in eight unique combinations in accordance with said groups of three binary digits.

8. The system of claim 6 wherein said mapping means generates a ninth unique group of two ternary digits and receives a pair of said groups of three binary digits and generates in accordance therewith a pair of said groups of two ternary digits, one of said groups of said ternary digits being said ninth unique group.

9. The system of claim 4 which includes write conversion means for producing a data encoded write signal in accordance with a group of said second predetermined number of digits, said group including a digit to be encoded, a digit encoded in a previous time interval, and a digit to be encoded in a succeeding time interval.

10. The system according to claim 14 in which said previous time interval and said succeeding time interval occur in synchronism with said system write clock.

11. The system according to claim 1 wherein said medium contains transitions between sequentially arranged positively magnetized regions, negatively magnetized regions, and erased regions, the system further comprising reading means responsive to said magnetized regions for providing a read signal comprising a first pulse of predetermined positive amplitude when reading a transition from said negatively magnetized region to said positively magnetized region, a second pulse of predetermined negative amplitude when reading a transition from said positively magnetized region to said negatively magnetized region, a third pulse of positive amplitude, less positive then said first pulse, when reading a transition from said erased region to said positively magnetized region and when reading a transition from said negatively magnetized region to said erased region.

a fourth pulse of negative amplitude, less negative than said second pulse, when reading a transition from said erased region to said negatively magnetized region and when reading a transition from said positively magnetized region to said erased region.

12. The system of claim 11 further comprising comparator means receiving said read signal for producing an output signal when said read signal exceeds a predetermined level.

13. The system of claim 11 further comprising means receiving said read signal for providing an integrated signal.

14. The system of claim 13 further comprising comparator means receiving said integrated signal for producing a first output pulse when said integrated signal exceeds a first predetermined level and for producing a second output pulse when said integrated signal exceeds a second predetermined level, said second predetermined level being less than said first predetermined level.

15. The system of claim 11 which further comprises comparator means receiving said read signal for providing an output signal comprising first output pulse in response to said first pulse of said read signal, second output pulse in response to said second pulse of said read signal, third output pulse in response to said third pulse of said read signal, and fourth output pulse in response to said fourth pulse of said read signal.

16. The system according to claim 12 which includes a system read clock receiving said read signal and providing a read clock signal in synchronism with said read signal.

17. The system according to claim 16 further comprising restoring means receiving said output of said comparator and providing digits of a higher order than binary in synchronism with said read clock.

18. The system according to claim 16 wherein said read clock further comprises peak detecting means responsive to said pulses of said read signal, means coupled to said peak detecting means for providing oscillations corresponsing in phase and frequency to said pulses of said read signal, and means for time delaying said oscillations.

19. The system according to claim 17 further comprising mapping means responsive to groups of a first predetermined number of said higher order digits for producing groups of a second predetermined number of binary digits.

20. The system of claim 19 in which said mapping means receives ternary digits in groups of two and produces binary digits in groups of three corresponding to said group of two ternary digits.

21. The system of claim 20 wherein said mapping means produces groups of three binary digits in eight unique combinations in accordance with said groups of two ternary digits.

22. The system of claim 21 wherein said restoring means provides groups of two ternary digits in nine unique combinations and said mapping means produces said groups of three binary digits in accordance with the first eight of said nine unique combinations, the remaining ninth of said nine unique combinations being exclusive of said first eight.

23. The system of claim 22 wherein said mapping means produces a pair of said groups of three binary digits in accordance with a pair of said groups of two ternary digits, one of said pairs of ternary digits comprising identical digits selected from said first eight of said nine unique combinations, and the other of said pairs of ternary digits being said ninth unique combination.

* * * * *